US006437879B1

(12) United States Patent
Temple

(10) Patent No.: US 6,437,879 B1
(45) Date of Patent: Aug. 20, 2002

(54) INTERPOLATION OF GREYSCALE LEVELS

(75) Inventor: Stephen Temple, Cambridge (GB)

(73) Assignee: Xaar Technology Limited, Cambridge (GB)

( * ) Notice: Subject to any disclaimer, the term of this patent is extended or adjusted under 35 U.S.C. 154(b) by 0 days.

(21) Appl. No.: 09/152,961

(22) Filed: Sep. 14, 1998

Related U.S. Application Data

(63) Continuation of application No. PCT/GB97/00755, filed on Mar. 18, 1997.

(30) Foreign Application Priority Data

Mar. 18, 1996 (GB) .............................................. 9605640
Mar. 26, 1996 (GB) .............................................. 9606316

(51) Int. Cl.[7] ........................ G06K 15/02; H04N 1/407; H04N 1/409
(52) U.S. Cl. ..................... 358/3.01; 358/3.26; 358/525; 358/502
(58) Field of Search ......................... 358/1.9, 525, 533, 358/534, 535, 536, 454, 456, 457, 459, 298

(56) References Cited

U.S. PATENT DOCUMENTS

| 4,185,304 A | 1/1980 | Holladay ..................... 358/298 |
| 4,680,645 A | 7/1987 | Dispoto et al. ............. 358/298 |
| 5,425,112 A | 6/1995 | Kerz .......................... 382/270 |

FOREIGN PATENT DOCUMENTS

| DE | 44 11 614 A1 | 10/1994 | |
| EP | 0 547 382 A1 | 6/1993 | ............ H04N/1/40 |
| EP | 0 665 673 A3 | 6/1996 | .......... H04N/1/405 |

*Primary Examiner*—Scott Rogers
(74) *Attorney, Agent, or Firm*—Marshall, Gerstein & Borun

(57) ABSTRACT

In a method of colour printing using arrays of threshold value for interpolating between grey levels, the threshold values for each of the colours are provided by defining rows of threshold values, with each row having the same repeating sequence but offset. The repeating sequences are different for each colour but the offset is the same for all colours. The arrays best take the form $T_{ij}^c = (i*p^c - j*q^c) \% (r^c S)$.

30 Claims, No Drawings

INTERPOLATION OF GREYSCALE LEVELS

This is a continuation of International Application No. PCT/GB97/00755 filed Mar. 18, 1997, the entire disclosure of which is incorporated by reference.

This invention relates to the interpolation of greyscale levels and—in the most important example—to the interpolation of greyscale levels in dot-based printing techniques such as ink jet printing.

It is well known that in a printing technology which is capable of producing only a single dot size, greyscale images can be created by the appropriate spatial distribution of fixed size dots. In one well known technique, pixels are organised into square arrays with each pixel in the array being assigned a different threshold value. Typically, an eight by eight square array of pixels will provide sixty-four threshold values. This square array of sixty-four threshold values is tessellated across the whole picture. At each pixel, the local grey level is compared to the threshold value assigned to that element in the pixel array and a dot is created only if the local grey level is darker than the threshold value. In the case of colour printing, this operation is of course conducted separately for each of three colours and, usually, black.

This dither technique is simple to implement and fast to run. However, great difficulties are encountered in defining the threshold array in such a way as to produce acceptable results. It is found that boundaries between areas of constant grey level are accentuated by the eye's sensitivity to the change in pattern between the two areas. As will be recognised, the threshold approach defines for each grey level a characteristic pattern and shifts between certain grey levels—which may be adjacent—can result in pattern changes which are distracting to the eye.

Other forms of spatial distribution, such as error diffusion, have been developed in an attempt to overcome these difficulties. The basic approach of error diffusion techniques is that the "error" between the "actual" and "printed" grey levels at one pixel is taken into consideration in the thresholding decisions of neighbouring pixels. Even with the simplification that errors are only carried forward in time, error diffusion techniques are complex to implement. They tend—moreover—to produce characteristically noisy grey levels.

It is an object of one form of the present invention to provide an improved method of interpolating a greyscale which enables the reduction of visually disturbing artifacts without complex processing.

The present invention has the further object of providing a solution to the problems with existing threshold arrays which is fundamental in character and which does not rely simply on empirical investigation.

Accordingly, the present invention consists in one aspect in a method of interpolating a greyscale between pixel levels in a regular array of pixels, where threshold values are associated with pixels and at each pixel a selection is made between said pixel levels in accordance with a comparison between the desired grey level and the threshold value associated with that pixel, charactersed in that rows of threshold values are defined, each row having the same repeating sequence of values with the i'th value in the sequence of the form (i*p)%S where p and S are integers and the notation a%b denotes the remainder after integer division of a by b, there being a constant offset of d pixels in the phase of the repeating sequence from one row to the next.

It is recognised in the present invention that the problem of patterning can be identified with variations in horizontal and vertical spatial frequencies between greyscale levels in the two-dimensional prior art threshold arrays. The eye is extremely sensitive to the contrast between certain spatial frequencies; changes from vertical stripes to horizontal stripes are, for example, particular noticeable, as are changes from stripes to a check. The novel approach of the present invention, by first assigning the threshold values to a linear array or row, and then creating subsequent rows by repeating the sequence with a constant offset, forces the spatial frequency content of all greyscale levels towards diagonals. The phase of the repeating sequence, determined for example by reference to the location of a specified threshold value (which might conveniently be zero), thus increases by a constant number of pixels from one row to the next succeeding row. With the spatial frequency content of all greyscales patterns being similar, the boundaries between levels become much less noticeable. It is also observed that, because of the eye's reduced sensitivity to diagonal lines, as opposed to horizontal or vertical lines, the intrinsic visibility of the patterns is reduced.

The repeating sequence of threshold values in each row will contain all values of the greyscale, say S values. In comparison with the prior art approach of square threshold arrays of side √S and "area" S, the approach of the invention results in "unit squares" of side S and area S2. Rather surprisingly, this increase in size of the "unit square" has no material disadvantages in the quality of the image. Moreover, this observation remains true for larger values of S.

In this form of the invention, the i'th value of the repeating sequence of threshold values is defined as (i*p) % S, where p is a non-zero integer. The notation a%b denotes the remainder after integer division of a by b. By way of example, the function: (i*3) % 7 will produce the series:

3 6 2 5 1 4 0 3 6 2 5

Preferably, p and S are mutually prime.

This approach elegantly assigns the threshold values to the row in an even manner. It further enables control over the difference in threshold values between adjacent pixels of the row. By increasing this difference, the spatial resolution of the image is increased, in the sense that the greater is the difference in threshold between adjacent levels, the more likely is a change in input grey level to result in a change in pixel level. Thus p is preferably chosen to be close to S/2.

The constant offset of pixels in the phase of the repeating sequence from one row to the next succeeding row may be defined as d and, preferably d is not a factor of S.

The approach of defining repeating sequences in rows and then repeating rows with a constant offset can be considered also from a more symmetric viewpoint. Take a general array i,j—which includes the special case where i denotes the location in the row and j the number of the row— and define the threshold value at each point of the array as $T_{ij}$. This threshold value can then be defined as:

$$T_{ij} = (i*p - j*q) \% S$$

where the notation %S denotes as before the remainder after integer division by S. It can be seen that this approach produces a constant offset d between the j'th and (j+1)'th rows of d where:

$$q = (S - dp) \% S$$

which can be stated more simply as $$q = (-dp) \% S$$

Looking at the problem of spatial resolution in both directions, there is a preference for:

p≈S/2 or q =S/2

In the prior art, the various techniques of dither and the like have been viewed as ways to produce a greyscale from printing technologies which are fundamentally binary, for example ink jet print heads which in any channel either produce an ink drop or do not. Many other printing technologies are intrinsically capable of handling greyscate and accommodate pixel values of zero to N. this being the desired greyscale range. Efforts are being made, with some success, to provide this intrinsic greyscale capability in ink jet and other, once, binary technologies by providing for N different sizes of ink drop and thus N pixel values. In a typical arrangement, a minimum value for N will be 64, which is generally regarded as being the minimum number of levels which the eye can perceive without there being obvious contrast between levels. Providing this number of distinct drop sizes in a reproducible manner, is not straightforward and in many cases, especially drop-on-demand ink jet printing, may force undesirable design compromises in other areas. For example, the smallest drop may be so small as to cause errors in placement due to aerodynamic effects.

Accordingly, the present invention, has in a different aspect, the object of providing a visually acceptable greyscale with a range of pixel values g which is significantly less than N.

Thus, in a further aspect, the present invention consists in a method of interpolating n levels between each of g pixels in a regular array of i,j pixels, where n threshold values are associated with the pixels and at each pixel a selection is made between said pixel levels in accordance with a comparison between the desired grey level G and the threshold value $T_{ij}$ for that pixel, where $T_{ij}=(I*p-j*q)$ % n, where p and q are integers and the notation a%b denotes the remainder after integer division of a by b, thereby to produce a visually perceived grey scale having g(n−1)+1=N levels.

In this way, embodiments of the present invention are capable of providing greyscales of perhaps 256 levels, using 8 or less pixel values or—in terms of ink jet printing—8 or less distinct drop sizes. It is found that a number of ink jet printing (and indeed other printing technologies) are capable of providing this number of pixel values in a relatively straightforward manner and without compromise in other design parameters. This invention enables in this example, however, greyscale reproduction which is close in quality to that achievable with 256 true pixel values.

It has already been observed that the most important application of greyscales lies generally in colour printing. For this purpose, the thresholding technique which has been described above can be applied to each of the—usually four colours Cyan, Magenta, Yellow and Black. It is a well recognised effect in conventional colour printing that inappropriately chosen masks for the respective colours can lead to visually disturbing Moire effects. One straightforward way to apply the thresholding approach of the present invention to each of four colours without risk of Moire problems would be to employ the identical threshold array $T_{ij}$ for each colour. It is recognised within the present invention, however, that spatial resolution can be improved significantly by employing different threshold arrays for the respective colours and the present invention has in yet a further aspect, the object of providing sets of threshold arrays which are mutually distinct which avoid Moire effects or reduce them to acceptable levels.

Accordingly, the present invention consists in yet a further aspect in a method of interpolating for each of a plurality of colours a greyscale between pixel levels in a regular array of pixels, where threshold values are associated with the pixels and at each pixel a selection is made between said pixel levels in accordance with a comparison between the desired level for each colour and the threshold value for that colour at that pixel, wherein the threshold values for each of the colours are provided by defining rows of pixels, with each row having the same repeating sequence of threshold values, there being a constant offset of pixels in the phase of the repeating sequence from one row to the next succeeding row, wherein the repeating sequences associated respectively with the colours are different for each colour and wherein the constant offset is the same for each colour.

Throughout the foregoing, the threshold values have been stated as integer values with the number S being selected somewhat arbitrarily. In an application where the grey level information defining the image to be printed has N levels, the threshold values can be scaled using the scaling factor (S−1)/N.

In one form of the invention, the locations in the respective arrays of corresponding zero threshold values are are offset one from another and are preferably symmetrically disposed.

Suitably, the threshold value $T_{ij}^c$ at the i'th position of the j'th row for the c'th colour, there being a constant offset of d in the phase of the repeating sequence from one row to the next succeeding row, is given by:

$$T_{ij}^c=(i-i_0^c)*p^c+(j-j_0^c)*q^c) \% (m^cS)$$

where:

$$q^c=(m^cS-dp^c)\%(M^cS)$$

where $m^c$ is an integer which is small compared to S.

Advantageously, the points $(i_0^c, j_0^c)$ are substantially evenly spaced from a common reference.

In an important application, the present invention further consists in a method of ink jet printing utilising an ink jet printhead capable of printing pixels of two or more levels, wherein a greyscale is interpolated between said levels in accordance with any one of the preceding statements of invention.

This invention will now be further described with reference to specific examples of threshold arrays and it is convenient to look first at an example with a value of S which is small, say 7. It will be seen that using the relationship:

$$T_i=(i*p)\%S$$

and the set of numbers 0 to S−1, the following sequences can be developed, chosing different values for p. Thus, p=2 generates:

T=0, 2, 4, 6, 1, 3, 5, 0, 2 . . . for increasing i.

Selecting an offset value of, for example d=3, then produces an array $T_{ij}$ with each row having the same repeating sequence 0, 2, 4, 6, 1, 3, 5, offset three pixels from any one row to the next, thus:

| 0 | 2 | 4 | 6 | 1 | 3 | 5 | <u>0</u>* | 2 | 4 |
|---|---|---|---|---|---|---|---|---|---|
| 1 | 3 | 5 | <u>0</u> | 2* | 4* | 6* | 1 | 3 | 5 |
| 2 | 4 | 6 | 1* | 3* | 5* | <u>0</u> | 2 | 4 | 6 |
| 3 | 5 | <u>0</u> | 2 | 4 | 6 | 1 | 3 | 5 | 0 |
| 4 | 6 | 1 | 3 | 5 | 0 | 2 | 4 | 6 | 1 |
| 5 | <u>0</u> | 2 | 4 | 6 | 1 | 3 | 5 | 0 | 2 |
| 6 | 1 | 3 | 5 | 0 | 2 | 4 | 6 | 1 | 3 |

-continued

| 0 | 2 | 4 | 6 | 1 | 3 | 5 | 0 | 2 | 4 |
|---|---|---|---|---|---|---|---|---|---|
| 1 | 3 | 5 | 0 | 2 | 4 | 6 | 1 | 3 | 5 |
| 2 | 4 | 6 | 1 | 3 | 5 | 0 | 2 | 4 | 6 |

It will be observed that the columns of this array are of the form:

$$T_j = (j*q)\%S; \text{ where } q=1.$$

In accordance with one form of this invention, three other threshold arrays are provided (producing, in total, one for each of four colours) utilising different sequences of the same numbers, and a constant offset d=3. Including the example given above, the four sequences can be seen to be:

| p = 1 | 0 | 1 | 2 | 3 | 4 | 5 | 6 | 0 |
|-------|---|---|---|---|---|---|---|---|
| p = 2 | 0 | 2 | 4 | 6 | 1 | 3 | 5 | 0 |
| p = 3 | 0 | 3 | 6 | 2 | 5 | 1 | 4 | 0 |
| p = 6 | 0 | 6 | 5 | 4 | 3 | 2 | 1 | 0 |

For convenient representation, negative values of p may be taken to the base S so that for example, p=6 may be regarded as equivalent to p=−1, with "−1" producing the number which precedes 0 in the sequence 0 1 2 3 4 5 6 0 1 2 3 4 5 6 0 . . .

Utilising the expression: $T_{ij}=(i*p-j*q)$ % S with q=dp−nS, where n is an integer and may be zero, the four threshold arrays can be written as S=7
d=3
$p^1=1$
$p^2=2$
$p^3=3$
$p^4=-1$ The after values can be re-written as
$p^1=p$
$p^2=p'$
$p^3=p+p'$
$p^4=p-p'$ where p=1 and p'=2.

This notation of p and p' may be a more convenient way to characterize the four arrays. The corresponding q and q' coefficients can be written as:

q=dp−nS and q'=dp'−n'S

It will be observed that these four arrays, whatever the notation chosen to depict them, have the property that the zero threshold values are coincident in all four arrays. In this way Moire effects between colours printed using these threshold arrays, are avoided or very much reduced. By way of explanation, it can be observed that all threshold values will fall within an elementary rhomboidal area of the array bounded by four zero values. In the above table of threshold values, for example, the threshold values marked * can be seen to fall within the elementary rhomboidal area of the array bounded by zero values marked by underlining "0". Any Moire effect should thus be expected to be confined to the elementary area and have negligible visual effect.

An example will now be taken of much larger S. A useful, Moire-free set of four threshold arrays can be written as
S=65
d=18
$p^1=-7$
$p^2=4$
$p^3=-3$
$p^4=-11$ The latter values can again be re-written as:
$p^1=p$
$p^2=p'$
$p^3=p+p'$
$p^4=p-p'$ where p=−7 and p'=4.

Sets of arrays can be regarded as determined by choices of: S;d;p and p'. In a further generalisation, it has been recognised that arrays in a set which is Moire-free can vary also as multiples of S. That is to say, for a constant value of d and selected values of p and p', arrays in the set can be written as:

$$T_{ij}=(i*p-j*q)\%(mS)$$

where m is a small, integral multiplier of, for example, 1, 2 or 3.

Looking at arrays of the form: S;m;d;p and p' it remains convenient to use the substitutions:

$$q=(dp-nmS)\%mS \text{ and } q'=(dp'-n'mS)\%mS$$

where there applies the condition:

$$np'-n'p=1$$

If the requirement for arrays in the set is that zero values are coincident, it is found that the previously mentioned solutions:

$$p \ p' \ p+p' \ p-p'$$

can be viewed as special cases of:

$$ap+bmp'$$

where a and b are integers which may be zero. It is then possible to identify patterns whose "zero's" coincide at arrays of points:

$$aq'+bmq', \ ap+bmp'$$

Such arrays limit Moire effects to the smallest common array of zero's.

A further example of useful arrays can be written
S=29
d=−17
$p^1=2$ $m^1=1$
$p^2=-5$ $m^2=1$
$p^3=-3$ $m^3=2$
$p^4=-7$ $m^4=2$ The latter values can again be re-written as
$p^1=p$
$p^2=p'$
$p^3=p+p'$
$p^4=p-p'$, where p=2 and p'=−5.

The requirement for arrays in a set which is Moire-free can be satisfied if the zeros in respective arrays are coincident or can be made coinicident through translation of the arrays. Indeed, there is believed to be advantage in having the zero values of the respective arrays offset one from the other by small regular amounts so that the arrays are distributed uniformly. Thus given four, initially coincident, zero values from the respective arrays at:

(0,0) (q,p) (q',p') ((q+q'),(p+p')) it can be seen that the arrays can be offset, evenly one from the other by selecting "new" zero value points at:

(0,0) (q/2,p/2) (q'/2,p'/2) (q+q')/2,(p+p')/2)

Of course, it will be necessary to select integer values close to q/2 and so on.

An alternative approach for describing the offset between the four arrays is to define for three arrays (the choice for the first array being arbitrary) offset origins $i_0$ and $j_0$.

Examples will now be given of particularly preferred arrays

EXAMPLE 1

S=5 d=2 p=1 p'-2

Using the above offset rule, the four arrays $T_{ij}$, can be written:

$$T_{ij}=(p(i-i_0)-q(j-j_0))\%S \text{ with } m \text{ being unity}$$

or:

$$T_{ij}[\text{cyan}]=(i-2j)\%5$$

$$T_{ij}[\text{magenta}]=(-2i-(j-1))\%5$$

$$T_{ij}[\text{yellow}]=(-(i-1)-3j)\%5$$

$$T_{ij}[\text{black}]=(-3(i-1)+(j-1))\%5$$

These arrays then take the form:

Cyan

| | | | | | | | | |
|---|---|---|---|---|---|---|---|---|
| 0 | 1 | 2 | 3 | 4 | 0 | 1 | 2 | 3 |
| 3 | 4 | 0 | 1 | 2 | 3 | 4 | 0 | 1 |
| 1 | 2 | 3 | 4 | 0 | 1 | 2 | 3 | 4 |
| 4 | 0 | 1 | 2 | 3 | 4 | 0 | 1 | 2 |
| 2 | 3 | 4 | 0 | 1 | 2 | 3 | 4 | 0 |
| 0 | 1 | 2 | 3 | 4 | 0 | 1 | 2 | 3 |
| 3 | 4 | 0 | 1 | 2 | 3 | 4 | 0 | 1 |
| 1 | 2 | 3 | 4 | 0 | 1 | 2 | 3 | 4 |
| 4 | 0 | 1 | 2 | 3 | 4 | 0 | 1 | 2 |

Magenta

| | | | | | | | | |
|---|---|---|---|---|---|---|---|---|
| 1 | 4 | 2 | 0 | 3 | 1 | 4 | 2 | 0 |
| 0 | 3 | 1 | 4 | 2 | 0 | 3 | 1 | 4 |
| 4 | 2 | 0 | 3 | 1 | 4 | 2 | 0 | 3 |
| 3 | 1 | 4 | 2 | 0 | 3 | 1 | 4 | 2 |
| 2 | 0 | 3 | 1 | 4 | 2 | 0 | 3 | 1 |
| 1 | 4 | 2 | 0 | 3 | 1 | 4 | 2 | 0 |
| 0 | 3 | 1 | 4 | 2 | 0 | 3 | 1 | 4 |
| 4 | 2 | 0 | 3 | 1 | 4 | 2 | 0 | 3 |
| 3 | 1 | 4 | 2 | 0 | 3 | 1 | 4 | 2 |
| 2 | 0 | 3 | 1 | 4 | 2 | 0 | 3 | 1 |

Yellow

| | | | | | | | | |
|---|---|---|---|---|---|---|---|---|
| 1 | 0 | 4 | 3 | 2 | 1 | 0 | 4 | 3 |
| 3 | 2 | 1 | 0 | 4 | 3 | 2 | 1 | 0 |
| 0 | 4 | 3 | 2 | 1 | 0 | 4 | 3 | 2 |
| 2 | 1 | 0 | 4 | 3 | 2 | 1 | 0 | 4 |
| 4 | 3 | 2 | 1 | 0 | 4 | 3 | 2 | 1 |
| 1 | 0 | 4 | 3 | 2 | 1 | 0 | 4 | 3 |
| 3 | 2 | 1 | 0 | 4 | 3 | 2 | 1 | 0 |
| 0 | 4 | 3 | 2 | 1 | 0 | 4 | 3 | 2 |
| 2 | 1 | 0 | 4 | 3 | 2 | 1 | 0 | 4 |

Black

| | | | | | | | | |
|---|---|---|---|---|---|---|---|---|
| 2 | 4 | 1 | 3 | 0 | 2 | 4 | 1 | 3 |
| 3 | 0 | 2 | 4 | 1 | 3 | 0 | 2 | 4 |
| 4 | 1 | 3 | 0 | 2 | 4 | 1 | 3 | 0 |
| 0 | 2 | 4 | 1 | 3 | 0 | 2 | 4 | 1 |
| 1 | 3 | 0 | 2 | 4 | 1 | 3 | 0 | 2 |
| 2 | 4 | 1 | 3 | 0 | 2 | 4 | 1 | 3 |
| 3 | 0 | 2 | 4 | 1 | 3 | 0 | 2 | 4 |
| 4 | 1 | 3 | 0 | 2 | 4 | 1 | 3 | 0 |
| 0 | 2 | 4 | 1 | 3 | 0 | 2 | 4 | 1 |
| 1 | 3 | 0 | 2 | 4 | 1 | 3 | 0 | 2 |

These arrays can then be summarised in tabular form:

S=5 d=2

| p | q | $i_0$ | $j_0$ |
|---|---|---|---|
| 1 | 2 | 0 | 0 |
| -2 | 1 | 0 | 1 |
| -1 | 3 | 1 | 0 |
| -3 | -1 | 1 | 1 |

EXAMPLE 2

This can now be described in the same tabular form:

S=13 d=8

| p | q | $i_0$ | $j_0$ |
|---|---|---|---|
| 4 | 6 | 0 | 0 |
| -6 | 4 | 1 | 1 |
| -1 | 5 | -1 | 1 |
| -5 | -1 | 0 | 2 |

EXAMPLE 3

S=29 d=17

| p | q | $i_0$ | $j_0$ |
|---|---|---|---|
| 4 | 10 | 0 | 0 |
| -10 | 4 | 2 | 1 |
| -6 | 14 | 1 | -2 |
| -14 | -6 | 3 | -1 |

EXAMPLE 4

S=65 d=18

| p | q | $i_0$ | $j_0$ |
|---|---|---|---|
| 16 | 28 | 0 | 0 |
| −28 | 16 | 3 | 2 |
| −6 | 22 | 2 | −3 |
| −22 | −6 | 5 | −1 |

The above quoted array sets are found to give particularly good printing results, with minimal artifacts, good colour rendition and high spatial resolution. They differ as between the value of S and thus, notionally, the number of greyscales that can be interpolated. In the case of a binary printer, for example an ink jet printer capable of depositing only one drop size, the array with S=65 would be appropriate. If the printer were capable of working at four pixel levels, being "white" and three differently sized printed drops, the array with S=29 should be used. Similarly, the arrays with S=13 and S=5 will find appropriate application with printers offering eight or sixteen pixel levels, respectively.

Generally speaking, it is believed that a value of S should be chosen so that the product of the number of pixel levels above white (that is to say, for a binary printer, 1) and S should be above—but only just above—the minimum number of levels which the eye can perceive without there being obvious contrast between levels. This is generally quoted as 64.

The four specific examples quoted above share the feature that the basic patterns: (p,q); (p',q'); (p+p',q+q') and (p−p', q−q') form squares. It has been found that such patterns give pleasing effects but the present invention is not limited to such patterns.

In the case of the patterns S=13, S=29 and S=65, the values of the p and q pairs have a common factor. This does not alter the patterns formed by the zero values but does increase the complexity of the pattern and gives rise to smoother rendition of intermediate tones. The offsets are based on the p and q values before they are multiplied by the common factor. It should also be noted that by multiplying by a factor, one of the p and q values is brought close to S/2 has as previously been described as desirable.

It will be understood that the various threshold arrays that have be discussed can be used in many different ways to interpolate a greyscale between pixel levels by associating threshold values with pixels and at each pixel making a selection between pixel levels in accordance with a comparison between the desired grey level and the threshold value associated with that pixel. The comparison can be performed directly or in an indirect manner involving—for example—arithmetic combination of linear functions of the desired grey level and threshold values and appropriate truncation. Whilst the invention in its various aspects is of particular applicability to printing and especially ink jet printing, it will find application in other contexts.

What is claimed is:

1. A method of interpolating a greyscale between pixel levels in a regular array of pixels, where threshold values are associated with pixels and at each pixel a selection is made between said pixel levels in accordance with a comparison between the desired grey level and the threshold value associated with that pixel, characterised in that rows of threshold values are defined, each row having the same repeating sequence of values with the i'th value in the sequence of the form (i*p)%S where p and S are integers and the notation a%b denotes the remainder after integer division of a by b, there being a constant offset of d pixels in the phase of the repeating sequence from one row to the next.

2. A method according to claim 1, wherein p and S are mutually prime.

3. A method according to claim 1, wherein p is approximately equal to S/2.

4. A method according to claim 1, wherein d is not a factor of S.

5. A method according to claim 1, wherein the threshold value $T_{ij}$ at the i'th position of the j'th row is given by:

$$T_{ij}=(i*p-j*q)\%S$$

where q is an integer.

6. A method of interpolating a greyscale between pixel levels in a regular array of pixels, where threshold values are associated with pixels and at each pixel a selection is made between said pixel levels in accordance with a comparison between the desired grey level and the threshold value associated with that pixel, characterised in that the threshold value $T_{ij}$ at the i'th position of the j'th row is given by:

$$T_{ij}=(i*p-j*q)\%S$$

where p, q and S are integers and the notation a%b denotes the remainder after integer division of a by b.

7. A method according to claim 6, wherein p and S are mutually prime, q and S are mutually prime and p is not equal to q.

8. A method according to claim 6, wherein either one of p or q is approximately equal to S/2.

9. A method according to claim 6, in which N grey levels are required, wherein the threshold values are scaled using the scale factor (S−1)/N.

10. A method of interpolating n levels between each of g pixels in a regular array of i,j pixels, where n threshold values are associated with the pixels and at each pixel a selection is made between said pixel levels in accordance with a comparison between the desired grey level $G_{ij}$ and the threshold value $T_{ij}$ for that pixel, where $T_{ij}=(I*p-j*q)\%n$, where p and q are integers and the notation a%b denotes the remainder after integer division of a by b, thereby to produce a visually perceived grey scale having g(n−1)+1=N levels.

11. A method according to claim 10, wherein the value $P_{ij}$ of each pixel i,j in the range zero to g is selected according to:

if $(G_{ij}*g)\%N<(T_{ij}*N)/n$ then $P_{ij}=(G_{ij}*g)/N$ else $P_{ij}=((G_{ij}*g)/N)+1$ 12. A method of interpolating for each of a plurality of colors a greyscale between pixel levels in a regular array of pixels, where threshold values are associated with pixels and at each pixel a selection is made between said pixel levels in accordance with a comparison between the desired level for each color and the threshold value for that color at that pixel, wherein the threshold values for each of the colors are provided by defining rows of threshold values, with each row having the same repeating sequence of the form (i*p)%S where p and S are integers and the notation a%b denotes the remainder after integer division of a by b, there being a constant offset in the phase of the repeating sequence from one row to the next succeeding row, wherein the repeating sequences associated respectively with the colors are different for each color and wherein the constant offset is the same for all colors.

13. A method according to claim 12, wherein the threshold values in each repeating sequence comprise a set of numbers which are all different, the set of numbers being common to all colours.

14. A method according to claim 12, wherein $p^1 = p$ $p^2 = p'$ $p^3 = p+p'$ $p^4 = p-p'$.

15. A method according to claim 12, wherein the locations in the respective arrays of corresponding zero threshold values are are offset one from another.

16. A method according to claim 12, wherein the threshold value $T_{ij}^c$ at the i'th position of the j'th row for the c'th colour, there being a constant offset of d in the phase of the repeating sequence from one row to the next succeeding row, is given by:

$$T_{ij}^c = ((i-i_0^c)*p^c - (j-j_0^c)*q^c) \% (m^c S)$$

where:

$$q^c = (m^c S - dp^c) \% (m^c S)$$

and where $m^c$ is an integer which is small compared to S.

17. A method according to claim 16, in which N grey levels are required, wherein the threshold values are scaled using the scale factor (S−1)/N.

18. A method according to claim 16, wherein the points ($i_0^c$, $j_0^c$) are substantially evenly spaced from a common reference.

19. A method of interpolating for each of a plurality of colors a greyscale between pixel levels in a regular array of pixels, where threshold values are associated with pixels and at each pixel a selection is made between said pixel levels in accordance with a comparison between the desired level for each color and the threshold value for that color at that pixel, wherein the threshold values for each of the colors are provided by defining rows of threshold values, with each row having the same repeating sequence, there being a constant offset in the phase of the repeating sequence from one row to the next succeeding row, wherein the repeating sequences associated respectively with the colors are different for each color and wherein the constant offset is the same for all colors and wherein the threshold values in each repeating sequence comprise a set of numbers which are all different, the set of numbers being associated with any one of the colors being related by a multiplier to the set of numbers associated with any other one of the colors.

20. A method of interpolating for each of a plurality of colors a greyscale between pixel levels in a regular array of pixels, where threshold values are associated with pixels and at each pixel a selection is made between said pixel levels in accordance with a comparison between the desired level for each color and the threshold value for that color at that pixel, wherein the threshold values for each of the colors are provided by defining rows of threshold values, with each row having the same repeating sequence, there being a constant offset in the phase of the repeating sequence from one row to the next succeeding row, wherein the repeating sequences associated respectively with the colors are different for each color and wherein the constant offset is the same for all colors and wherein for the c'th color the threshold value $T_{ij}^c$ at the i'th position of the j'th row is given by:

$$T_{ij}^c = (i*p^c - j*q^c) \% (r^c S)$$

where p, q and S are integers and the notation a%b denotes the remainder after integer division of a by b, and $r^c$ is an integer which is greater than or equal to 1 and small compared to S.

21. A method according to claim 20, wherein for each colour p and S are mutually prime, q and S are mutually prime and p is not equal to q.

22. A method according to claim 20, wherein (S=$q^c/p^c$) is constant.

23. A method according to claim 20, m which N grey levels are required, wherein the threshold values are scaled using a scale factor (S−1)/N.

24. A method of interpolating for each of a plurality of colors a greyscale between pixel levels in a regular array of pixels, where threshold values are associated with pixels and at each pixel a selection is made between said pixel levels in accordance with a comparison between the desired level for each color and the threshold value for that color at that pixel, wherein the threshold values for each of the colors are provided by defining rows of threshold values, with each row having the same repeating sequence, there being a constant offset in the phase of the repeating sequence from one row to the next succeeding row, wherein the repeating sequences associated respectively with the colors are different for each color and wherein the constant offset is the same for all colours and wherein the threshold value $T_{ij}^c$ at the i'th position of the j'th row for the c'th color, there being a constant offset of d in the phase of the repeating sequence from one row to the next succeeding row, is given by $$T_{ij}^c (i*p^c - j*q^c) \% (m^c S)$$

where:

$$q^c = (m^c S - dp^c) \% (m^c S)$$

and $m^c$ is an integer which is small compared to S.

25. A method according to claim 24, wherein $m^c$ is unity.

26. A method according to claim 24, wherein:

$$p^c = a^c p + b^c p'$$

where a and b are integers.

27. A method according to claim 24, in which N grey levels are required, wherein the threshold values are scaled using the scale factor (S−1)/N.

28. A method of interpolating for each of a plurality of colors a greyscale between pixel levels in a regular array of pixels, where threshold values are associated with pixels and at each pixel a selection is made between said pixel levels in accordance with a comparison between the desired level for each color and the threshold value for that color at that pixel, wherein the threshold values for each of the colors are provided by defining rows of threshold values, with each row having the same repeating sequence, there being a constant offset in the phase of the repeating sequence from one row to the next succeeding row, wherein the repeating sequences associated respectively with the colors are different for each color and wherein the constant offset is the same for all colors and wherein the locations in the respective arrays of corresponding zero thresholds are offset from one another, and wherein the locations in the respective arrays of corresponding zero threshold values are symmetrically disposed.

29. A method of ink jet printing utilising an ink jet printhead capable of printing pixels of two or more levels, wherein a greyscale is interpolated between said levels in accordance with claim 1.

30. A printer constructed and adapted to operate a method of interpolating a greyscale between pixel levels in a regular array of pixels which is in accordance with claim 1.

* * * * *

UNITED STATES PATENT AND TRADEMARK OFFICE
CERTIFICATE OF CORRECTION

PATENT NO.     : 6,437,879 B1
DATED          : August 20, 2002
INVENTOR(S)    : Stephen Temple It is certified that error appears in the above-identified patent and that said Letters Patent is hereby corrected as shown below:

<u>Column 11,</u>
Line 8, please delete, "values are are offset" and insert -- values are offset --.

Signed and Sealed this

Eighth Day of April, 2003

JAMES E. ROGAN
*Director of the United States Patent and Trademark Office*